US011024295B2

(12) United States Patent
Schmidt et al.

(10) Patent No.: US 11,024,295 B2
(45) Date of Patent: *Jun. 1, 2021

(54) FILTERING DATA IN AN AUDIO STREAM

(71) Applicant: International Business Machines Corporation, Armonk, NY (US)

(72) Inventors: Jeffrey A. Schmidt, Rochester, MN (US); Adam D. Braham, Rochester, MN (US); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,049

(22) Filed: Sep. 9, 2019

(65) Prior Publication Data

US 2020/0005773 A1 Jan. 2, 2020

Related U.S. Application Data

(63) Continuation of application No. 15/824,051, filed on Nov. 28, 2017, now Pat. No. 10,453,447.

(51) Int. Cl.
| | |
|---|---|
| *G10L 15/22* | (2006.01) |
| *G10L 15/18* | (2013.01) |
| *G10L 25/51* | (2013.01) |
| *H04M 3/51* | (2006.01) |
| *G06F 40/216* | (2020.01) |
| *G06F 40/284* | (2020.01) |
| *G10L 15/30* | (2013.01) |
| *G10L 15/08* | (2006.01) |

(52) U.S. Cl.
CPC ........ *G10L 15/1815* (2013.01); *G06F 40/216* (2020.01); *G06F 40/284* (2020.01); *G10L 15/22* (2013.01); *G10L 25/51* (2013.01); *H04M 3/5166* (2013.01); *G10L 15/30* (2013.01); *G10L 2015/088* (2013.01)

(58) Field of Classification Search
CPC ................................ G10L 15/22; H04M 3/51
See application file for complete search history.

(56) References Cited

U.S. PATENT DOCUMENTS

| | | | |
|---|---|---|---|
| 8,140,012 B1 | 3/2012 | Causey et al. | |
| 8,473,451 B1 | 6/2013 | Hakkani-Tur et al. | |

(Continued)

FOREIGN PATENT DOCUMENTS

| | | |
|---|---|---|
| CN | 105843950 A | 8/2016 |
| CN | 106504744 A | 3/2017 |
| CN | 106528731 A | 3/2017 |

OTHER PUBLICATIONS

Unknown, "Services Quality Monitoring & Evaluation," BPA Quality, printed Nov. 15, 2017, 5 pages.

(Continued)

*Primary Examiner* — Daniel Abebe
(74) *Attorney, Agent, or Firm* — Jared C. Chaney

(57) ABSTRACT

Disclosed herein is a system, method, and computer program product for automatic blocking of audible, sensitive data. Incoming audio is converted into text and analyzed for sensitive information. Based on the detection of sensitive information from a source, a recipient is blocked from receiving the audible sensitive information.

18 Claims, 5 Drawing Sheets

(56) References Cited

U.S. PATENT DOCUMENTS

| | | | |
|---|---|---|---|
| 9,131,369 B2 | 9/2015 | Ganong, III et al. | |
| 9,256,764 B2 | 2/2016 | Aissi et al. | |
| 9,437,207 B2 | 9/2016 | Jacob et al. | |
| 9,514,741 B2 | 12/2016 | Jost et al. | |
| 9,699,317 B1* | 7/2017 | Pycko | H04M 3/5166 |
| 9,787,835 B1 | 10/2017 | Pycko et al. | |
| 2006/0089857 A1 | 4/2006 | Zimmerman et al. | |
| 2006/0190263 A1 | 8/2006 | Finke et al. | |
| 2007/0016419 A1 | 1/2007 | Lee et al. | |
| 2008/0037719 A1 | 2/2008 | Doren | |
| 2008/0221882 A1 | 9/2008 | Bundock et al. | |
| 2018/0032755 A1* | 2/2018 | Odinak | H04L 9/32 |
| 2018/0137295 A1* | 5/2018 | Sharma | H04L 63/04 |
| 2018/0213084 A1* | 7/2018 | Westlake | G10L 15/02 |
| 2019/0013038 A1* | 1/2019 | Thomson | G10L 15/22 |

OTHER PUBLICATIONS

Mell et al., "The NIST Definition of Cloud Computing," Recommendations of the National Institute of Standards and Technology, U.S. Department of Commerce, NIST Special Publication 800-145, Sep. 2011, 7 pages.

Guta, "Speech Analytics: The Indispensable Tool for Call Centers," BPA Quality, Jan. 27, 2016, 3 pages http://www.tmcnet.com/channels/bpa/articles/416651-speech-analyticsindispensable-tool-call-centers.htm.

Unknown, "Call Center Software," Capterra, Printed Nov. 28, 2017, 1 page http://www.capterra.com/call-center-software.

Unknown, "How do they stop people at call centers from stealing our banking/credit card information?", Reddit.com, Printed Nov. 28, 2017, 4 pages https://www.reddit.com/r/explainlikeimfive/comments/3mdcth/eli5_how_do_they_stop_people_at_call_centers_from/.

Unknown, "Speech Analytics," Mattsen Kumar, Printed Nov. 28, 2017, 3 pages Informationhttp://www.mattsenkumar.com/analytics/smartspeech/freedemo.html?gclid=COCI767LI9ICFZS3wAod_00Jqw.

Unknown, "Leveraging speech recognition technology in call centers," SearchCRM, TechTarget, Printed Nov. 28, 2017, 5 pages.

Schmidt et al., "Filtering Data in an Audio Stream," U.S. Appl. No. 15/824,051, filed Nov. 28, 2017.

List of Related Applications and Patents Treated as Related, Dated Sep. 3, 2019, 2 pages.

* cited by examiner

FILTERING DATA IN AN AUDIO STREAM

BACKGROUND

The present disclosure relates to speech recognition and, more specifically, to the automatic blocking of sensitive data contained in an audio stream.

Automatic speech recognition is a process for converting an audio signal, such as spoken language, that has been received by a computer or system to text. This conversion is achieved by using speech-to-text engines that use algorithms implemented through computer programs to automatically generate a sequence of text based on the audio signal.

SUMMARY

Various embodiments are directed to a method for selecting automatic blocking of audible, sensitive data. This decodes a portion of speech data with one or more speech-to-text engines and analyzes the text for key words that indicate sensitive data is about to be disclosed or is being disclosed. Once one or more key words are identified, the system can block the listener from hearing the sensitive information.

In an embodiment, the method, computer program product, and system include receiving the audio stream, the audio stream having spoken words, from an audio feed, converting the audio stream into text with at least one speech-to-text engine, analyzing, by a sensitive word detection engine, the text for text strings indicating sensitive information upon matching words in the text strings to the sensitive word list, and blocking, by a blocking engine, at least a portion of the audio stream wherein the portion of the audio stream that is blocked is at least a portion of the detected sensitive words.

DETAILED DESCRIPTION

Figure 1:
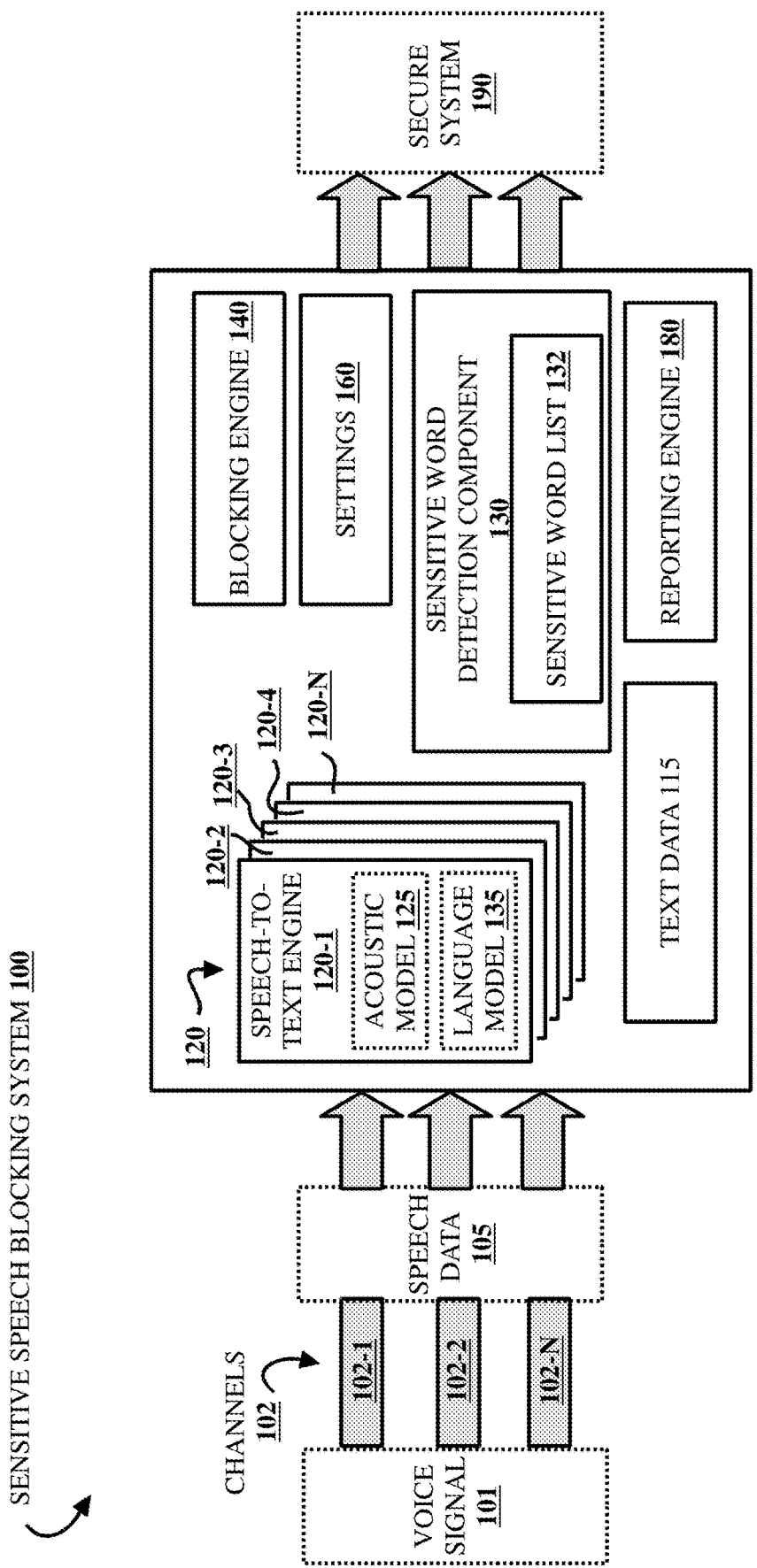
FIG. 1 is a block diagram illustrating a sensitive speech blocking system, according to some embodiments of the disclosure.

The process of automatic blocking of audible, sensitive data described herein involves automatically blocking listeners from hearing sensitive data in real time or close to real time. Sensitive information, such as credit card information, is often given over the phone employees that work for an organization. There have been multiple instances of those employees stealing the sensitive information and using it for illicit purposes. Intercepting the audio feed and blocking sensitive information from the employees would be one safety measure to help prevent the employees from stealing the sensitive information.

The process of automatic blocking of sensitive data contained in an audio stream decodes a portion of speech data with one or more speech-to-text engines and analyzes the text for key words that indicate sensitive data is about to be disclosed or is being disclosed. Once one or more key words are identified, the system can block the listener from hearing the speaker disclose the sensitive information. The system is trained by using real conversation streams (e.g., call data) to more accurately identify when sensitive information is about to be spoken. In some embodiments, the system is customized for each call taker in each call center. For example, different call takers may have different key word patterns indicating sensitive information is about to be spoken by the caller. Thus, the system becomes more accurate as it gains more information by dealing with different callers, languages, dialects, accents, etc.

The blocking sensitive speech or sensitive audio information (e.g., credit card information, health information, location, identity, etc.) can be used in various applications. One example of an application may involve giving credit card information to a call center when talking to a call center employee. In an example such as this, a representative of a company may call, or receive a call from, a potential customer. Over the course of the call, the potential customer may need to give credit card information. For example, saying "my credit card number is" triggers a computer system to block the subsequent credit card information and to record the information for the computer without ever letting the call center employee hear the information. After the computer system determines that the caller is no longer disclosing sensitive information, the computer system may stop blocking the call center employee from hearing the information.

In some embodiments, the system can also cut off the sensitive information if the system detects sensitive information after it has already started to be disclosed. For example, if the caller starts stating credit card digits, the system can immediately start blocking the audio feed from the other party before all the credit card numbers have been completely spoken. This facet can also be used for training the system. For example, after the system detects sensitive information, it can catalog the words preceding the sensitive information as words indicating that sensitive information is about to be given.

FIG. 1 is a block diagram illustrating components of a sensitive speech blocking system 100, that blocks sensitive speech in an audio feed. Sensitive speech blocking system 100 includes, audible input 101, at least one channel, 102-1, 102-2, 102-N, illustrated in FIG. 1, and referred to as collectively 102, computer-readable speech data 105, one or more speech-to-text engines 120-1, 120-2, 120-3, 120-4, 120-N, herein referred to as collectively 120, text data 115, sensitive word detection engine with a sensitive word list 132, a blocking engine 140, settings 160, and a reporting engine 180. Components in FIG. 1 can be software, hardware, or combinations thereof.

The sensitive speech blocking system 100 carries out processes of blocking sensitive information (e.g., social security numbers, routing numbers, account numbers, health information, and/or credit card information) from being heard by a listener. Audible input 101 is the source of the speech data 105 and can be spoken language transformed to data (e.g., digitally encoded, or in an analog format) that a processor can process. Audible input 101 can come from a variety of sources and may be recorded and processed in different ways. Audible input 101 may be any form of speech, such as live or prerecorded speech. Audible input 101 can also be synthesized speech, such as speech generated by a computer. Audible input 101 may, for example, include conversations on a telephone call, speech dictated into a recording device, conversations using video chat, etc. Audible input 101 can be digitized, and the resulting computer-readable speech data 105 can be analyzed in subsequent steps.

The audible input 101 is received by the least one channel, 102-1, 102-2, and 102-N. A channel can be any type of transmission medium, such as a wire, cable, optical fiber, etc. In some cases, audible input 101 may be recorded on a single channel 102, and in others, one or more audible input may be recorded on separate channels 102. FIG. 1 illustrates one sensitive speech blocking system 100. However more than one system can be employed in some embodiments. Additionally, while three channels are illustrated in FIG. 1, in some embodiments, there may be more or less channels 102 in system 100.

The sensitive speech blocking system 100, illustrated in FIG. 1, decodes received speech data 105 using one or more speech-to-text engines 120-1, 120-2, 120-3, 120-4, 120-N and sensitive word detection engine 130.

Speech-to-text engines 120 can be used to decode spoken language that has been converted to computer-readable speech data 105. Each of the speech-to-text engines 120 can operate at varying speeds and/or with varying levels of accuracy, and they may employ assorted models when decoding speech data 105. Two examples of these models, an acoustic model 125 and a language model 135, are illustrated in FIG. 1 as being included in speech-to-text engine 120-1. However, it should be noted that these models can also be present in the other speech to text engines. The acoustic 125 and language 135 models are examples of models that can be used, but other models can be used as well. Examples of other models that can be used may include phonetic word models, language models, sentence models, etc., which can detect various other elements of speech and recognize various other features of the speech data. Additional models and operations may be involved and, in some embodiments, models and operations that are discussed herein may be omitted.

The speech data 105 received by the sensitive speech blocking system 100 can be segmented into smaller portions. This may involve breaking the speech data 105 into chunks, which are often referred to as "frames." One approach to segmenting speech data 105 is to break it into frames of a fixed length of time or data. A common frame length is 10 milliseconds. However, other frame lengths can be used. Though breaking speech data 105 into frames is one exemplary method of segmentation, other approaches can be used as well. For example, speech data 105 can be broken into sections that are determined likely to be individual words or phrases.

The system takes the decoded language and runs it through sensitive word detection engine 130. In some embodiments, sensitive word detection engine 130 compares words and/or phrases provided by speech-to-text engine 120 to a sensitive word list 132. The received text can have various markers identified by one of the various models (e.g., model 125 and model 135) in speech-to-text engine 120, discussed in further detail below. The markers can indicate speech variation such as tone or dialect for sensitive word detection engine 130 to analyze along with a definition of each word. For example, the mention of the word plastic can mean either a polymer or a credit card depending on the person. In some embodiments, sensitive word detection component 130 can identify the meaning of the word by based on a history of the person or a regional dialect.

In some embodiments, sensitive word detection engine 130 analyzes language from any party involved in the conversation to prevent sharing of private information. For example, the call center employee might ask for a credit card, or in another instance the consumer might say "here is my credit card." In either instance the system can predict that sensitive information is about to be spoken.

After a determination is made that sensitive information is currently being spoken or is about to be spoken, blocking engine 140 can block one or more of the parties on the call from hearing the information. In some embodiments, the system 100 can have more than one than one blocking engine 140. For example, a call center employee would have a more restrictive blocking engine that blocks all sensitive information, while a manager would have a less restrictive engine that allows the manager to hear some sensitive information.

If sensitive word detection engine 130 determines that private data is already being spoken, and no preceding patterns were detected, blocking engine 140 can be directed to block the audio stream of a speaker from a listener. For example, if a credit card number is being read, but no credit card number preceding patterns were detected, blocking engine can start blocking the credit card number from the listener as soon as system 100 determines that a credit card number is being read (e.g., after 1 or more of the numbers).

In some embodiments, reporting engine 180 reports sensitive information to a secure system 190 designated to process the information. In some embodiments, the secure system includes all of the features of the normal system, but with enhanced security controls to prevent the unauthorized access to the sensitive data. In some embodiments, the secure system is a separate system designed to handle sensitive information. When the sensitive information is needed, the blocking engine 140 can block a listener from hearing the information and reporting engine 180 can report the information to the secure system 190 for processing. For example, if a patient is on the phone with a hospital billing agent, the billing system may need the patient's social security number, but the agent does not need to directly hear that information. Reporting engine can securely transmit the social security number, transcribed by speech-to-text engine 120 to the billing system, bypassing the agent.

Blocking engine 140 is a component of system 100 configure to stop blocking sensitive information once sensitive word detection engine 130 determines that the sensitive information is no longer being communicated. In some embodiments, sensitive word detection engine 130 determines that a speaker has completed giving the information and direct blocking engine 140 to stop blocking. For example, when the last digit of a social security number is read, the sensitive word detection engine can determine that the no further sensitive information is going to be spoken immediately. If the sensitive word detection engine 130 determines that a continuation word or phrase is spoken, sensitive word detection engine 130 can direct blocking engine 140 to resume the blocking. Continuation words or phrases can be repeat, repeat that, oops, mistake, wrong number, try again, etc.

In an embodiment, sensitive word detection engine 130 can determine a break in the sensitive information and temporarily unblock the call. For example, if the speaker interjects a question such as "wait did you mean the visa," sensitive word detection engine 130 can direct blocking engine 140 to unblock the call while the temporary pause is needed and direct blocking engine 140 to block the audio feed when sensitive information speaking is resumed.

In some embodiments, system does not report the information, but only blocks it. For example, a child's cell phone can block the child from giving location information to unapproved callers.

In some embodiments, the audio signal can be delayed to ensure that sensitive information is not heard. This can be used for instances when the sensitive word detection engine 130 does not pick up on the pre-pattern text in time to block the sensitive information. Delaying the audio signal can also be used so that if extra information is blocked, the listener does not have to ask the speaker to repeat themselves. For example, if a patient is describing the patient's symptoms to a hospital call center employee, the system might block the information if the call center employee does not have the proper credentials to hear personal information of the caller. However, if the patient asks a question directly after giving the personal information and the audio feed is still blocked, the call center employee might miss the question. By providing a slight delay in the audio feed, the system can have enough time to remove the block and allow the call center employee to hear the question.

In some embodiments, blocking engine 140 determines if the listener has the proper credentials to hear the information and determines if the audio signal should be blocked. Sensitive word detection engine 130 can attach a level value to each word or section of the audio and blocking engine 140 can compare that level value to the level listener to determine if the audio should be blocked or not. For example, a company may have different levels of call center employees. A first level might have a low sensitive information level and thus not be cleared to hear any sensitive information, while a fifth level employee might have a high sensitive information level and thus be certified to hear all sensitive information.

In some embodiments, when a pre-pattern of text is detected before sensitive information is spoken, the pre-pattern of text is stored in sensitive word list 132. Pre-patterns can be stored when the pre-pattern was not detected. Pre-patterns can also be stored when the pattern was detected, but the detected pre-pattern was different from any entry in sensitive word list 132. For example, if sensitive word detection engine 130 determined that "soc" was short for "social security number" it may still store "soc" in sensitive word list 132. In some embodiments, the system uses machine learning to analyze words or phrases entered into sensitive word list 132 and improve the sensitive word recognition system.

In some embodiments, the system also stores non-indicative text that does not lead to sensitive information. If the text does not come before sensitive information but is linked closely to pre-pattern text that does lead to sensitive information it is labeled as non-indicative text, and. The non-indicative text can be stored in sensitive word list 132 as a word or phrase that does not lead to sensitive information. For example, the system might link "socialize" as slang for "social security number," but "socialize" does not lead to sensitive information. Thus, when an instance of "socialize" is not followed by a social security number, the instance might be determined to be non-indicative text by sensitive word detection engine 130 and stored in sensitive word list 132 as a word that does not lead to sensitive information.

The acoustic model 125 enables the system 100 to detect and interpret features of individual sounds that comprise the speech data 105. An acoustic model 125 can represent the relationship between the audible input 101 and individual units of sound (e.g., language features such as phonemes, words, phrases, sentences, etc.). An acoustic model 125 may be trained by comparing a set of preexisting audio recordings (e.g., recordings of previous calls) to preexisting transcripts of those recordings. For example, previous calls where sensitive information was disclosed. Based on these comparisons, statistical representations of sounds that make up different features of a language can be created. An artificial neural network, such as a convolutional neural network, is an example of an acoustic modeling approach that can classify units such as individual sounds and words. Other approaches can also be used, such as a Hidden Markov Model (HMM), lattice based analysis, entropy based speech segmentation algorithms. In some examples, features of recorded sound may be matched to particular words or other sounds recognized by an acoustic model 125.

In order to enhance the accuracy of an acoustic model 125, the model 125 can be trained to recognize common features in speech data 105. Some of these features may interfere with the clarity of the recorded speech. Ambient noises, such as noises from wind or automobiles, are examples of possible interfering features. If an acoustic model 125 is trained to recognize and filter out this noise, sounds that are meant to be recognized, such as language features, can be isolated. For example, isolating language features in speech data 105 can facilitate its conversion to text data 115.

Additionally, an acoustic model 125 can be trained to recognize variations in the audible features of speech. This training may be accomplished in various ways. One approach is to record one or more people reading a scripted statement aloud, and then compare the spoken statement to its written transcript. In some embodiments, an acoustic model 125 may be trained to recognize particular accents. For example, at least one person with an Irish accent can be recorded reading scripted statements in order to train an acoustic model 125. This acoustic model 125 may then be particularly effective in decoding language spoken in an Irish accent. A model 125 such as this can be employed by a call center in Ireland. For even greater specificity, an acoustic model 125 can be trained to recognize a particular person. In one example, a person working in a call center may recite a scripted statement before they begin work. This may allow a speech-to-text engine 120 operating on the channel 102 or sensitive word detection engine 130 to recognize the sound of their individual voice more easily and thus the pre-pattern text.

Speech-to-text engines 120 can further decode speech data 105 with the aid of a language model 135. In FIG. 1, a language model 135 is illustrated within engine 120-1. A language model 135 can provide context that helps distinguish between words or phrases that sound similar to one another. In some embodiments, this can be done by using statistical models to estimate the probability of a word appearing in a particular context. A language model 135 can employ many of the same approaches to decoding as an acoustic model 125, including a Hidden Markov Model (HMM). A Hidden Markov Model can, based on context provided by a given set of words and phrases, predict which unobserved words and phrases may be likely to appear.

In one example, a language model 135 may predict that words like "retirement" and "investments" are frequently found with words like "fund" and "secure." This can allow the language model 135 to determine the difference between two possible interpretations of words or phrases recognized by an acoustic model 125. For instance, a speech-to-text engine 120 decoding a portion of speech data 105 may produce two alternate text interpretations: "I think my retirement fund is secure because of my investments" and 'I think my re-tire mint fund is secure because of my in vest mints'. The two interpretations differ in the words "retirement" and "re-tire mint," as well as "investments" and "in vest mints." However, both interpretations include the word "fund." Because the word "fund" may be known by the language model 135 to be commonly found with words like "retirement" and "investment," the model 135 may determine that the first interpretation is more likely to be correct.

A language model 135 can be trained in manner similar to that of an acoustic model 125. For example, in addition to training an acoustic model 125 with recordings of scripted statements spoken by people with Irish accents a language model 135 can be trained to recognize particular words and grammatical structures that are common to English as it is spoken in Ireland. One approach to this training is to enter into the model 135 examples of words, sentences, and grammatical conventions common in this region. These examples can be in the form of spoken language or text and may be entered by a user.

The text data 115 that is output by the speech-to-text engines 120 after decoding the speech data 105 can be used for various purposes. For example, text data 115 can be displayed to a viewer. In some cases, text data 115 may be displayed as the speech data 105 is decoded in real time. Examples of displaying real time text data 115 to a viewer include, captioned telephone calls, data entry, and transcribing, etc.

In other embodiments, the text data 115 may not be displayed or not be fully displayed. One example of this may be when a person is vocally communicating with a sales person. In a case such as this, a customer may want to purchase an item. The sales person may be telling the customer product details and eventually need credit card information to complete a purchase. The system may take down the pertinent information of the customer and allow non-sensitive information to appear on the screen for the sales person to verify. When sensitive information is given the sales person's audio feed may be blocked and the credit card information not displayed or obscured on the sales persons screen.

Figure 2:
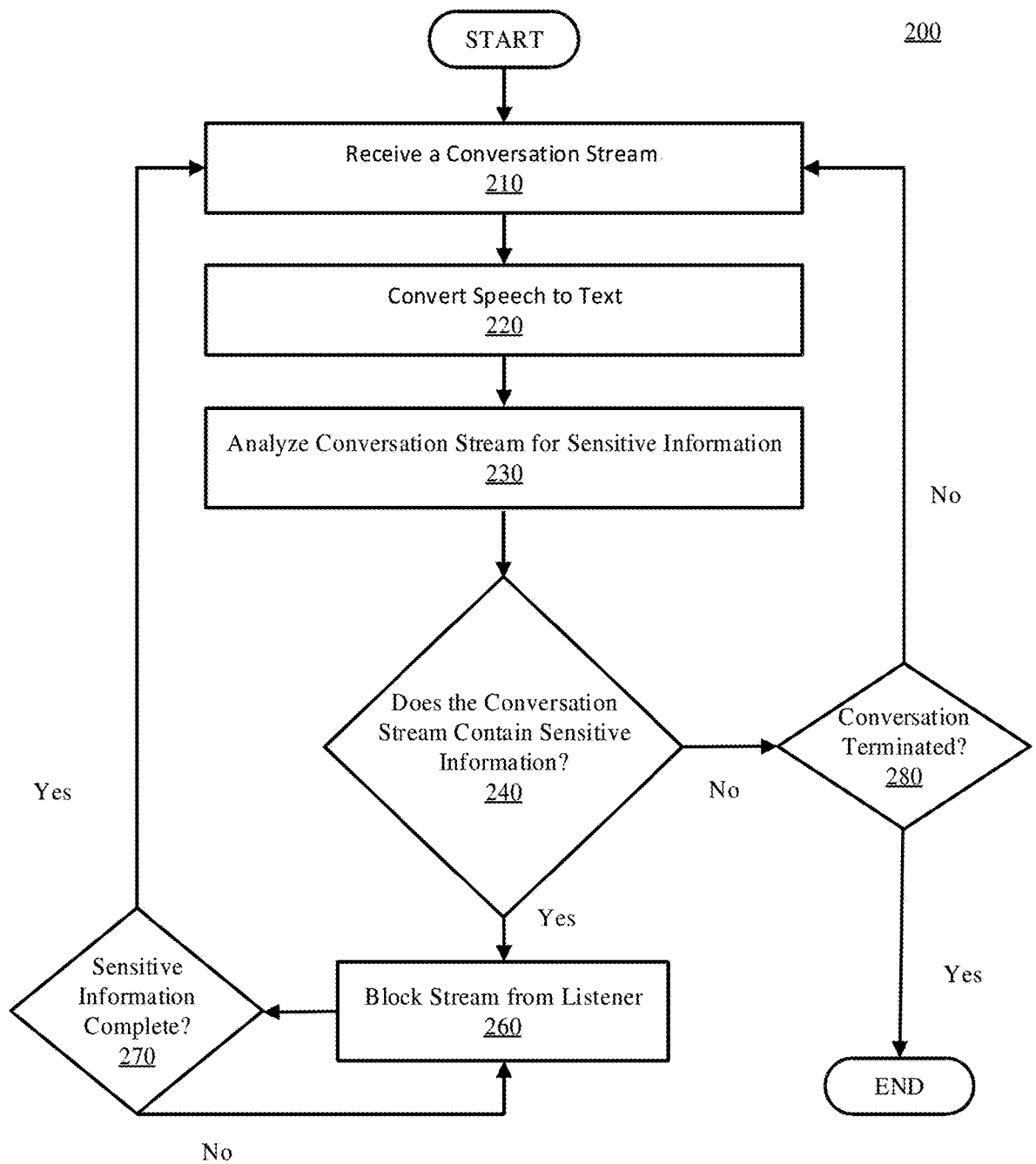
FIG. 2 is a flow diagram illustrating an exemplary sensitive speech blocking process, according to some embodiments of the disclosure.

FIG. 2 is a flow diagram illustrating a sensitive information blocking process 200, according to some embodiments. Process 200 is illustrated as being carried out by a single computer system, but, in other embodiments, the process may be carried out by computer systems. The process 200 begins when a portion of speech data 105 is entered into in the sensitive speech blocking system 100. The speech data 105 can come from an audible input 101 that was converted to computer-readable speech data 105, as described with respect to FIG. 1. In step 210 of process 200, speech data or a conversation stream is received into system 100 data 105.

In some embodiments, all available speech-to-text engines 120 may be used to convert speech data 105 into text at step 220. At step 220, different aspects of the speech are analyzed by and may be tagged for use by sensitive word detection engine 130. For example, particular segments of data can be tagged for dialect, accent, identity of a person, slang, etc.

The speech data 105 decoded in step 220 is analyzed for sensitive speech by, for example, sensitive word detection engine 130 in step 230. Samples of decoded speech stored in sensitive word list 132 can be compared to the text provided by speech-to-text engine 120 in step 230 to determination if sensitive information is about to be given, being given, or not detected.

Following analysis for sensitive information, the sensitive word detection engine 130 determines if the sensitive information is being given. This is illustrated at step 240. If sensitive information (i.e., sensitive information that is already being disclosed, or key words have been detected indicating sensitive information is about to be disclosed) is detected, blocking engine 140 blocks the audio stream from the listener at step 260. For example, blocking engine can start blocking the audio stream before a credit card number is read or while a credit card number is read.

Sensitive word detection engine 130 can continue to monitor the conversation, as described above, to determine if the sensitive information is still being disclosed at step 270. In some embodiments, this includes a determination that the sensitive information is complete (e.g., an entire credit card number has been given) or there is a pause in disclosing the sensitive information (e.g., speaker asks a question). In some embodiments, if the stream of sensitive information has not stopped, blocking engine 140 continues to block sensitive information by step 260. In some embodiments, if the flow of sensitive information has stopped, sensitive word detection engine 130 will continue to analyze the conversation stream (e.g., text from speech-to-text engine 120) at step 240.

In some embodiments, if step 240 makes the determination that no sensitive information is about to be disclosed, the system will check to see if the conversation is terminated in step 280. If the conversation is not terminated the system will continue to analyze the conversation stream in step 240. If, at step 280, the system determines that the conversation has been terminated the system will end the conversation. In some embodiments, sensitive word detection engine 130 continues to decode speech data 105 until the system 100 instructs it to stop due to the call being terminated or a stop word is detected (e.g., goodbye). In step 280, it is determined if there are instructions for stopping step 240 of the information blocking process 200. These instructions can be stored in settings 160.

In some embodiments, at step 280, it is determined if there are instructions directing the sensitive speech blocking system 100 to repeat one or more of the steps. These instructions can also be stored in settings 160. If there are instructions directing the system to repeat, for example, step 210, process 200 returns to step 210, and speech-to-text engines are again selected to decode and analyze the next portion of speech data 105 in a repeat of steps 210, 220, 230, 240, etc. If, in step 280, it is determined that the steps are not to be repeated, process 200 ends. In some embodiments, one or more of the steps may run simultaneously and/or in parallel.

Figure 3:
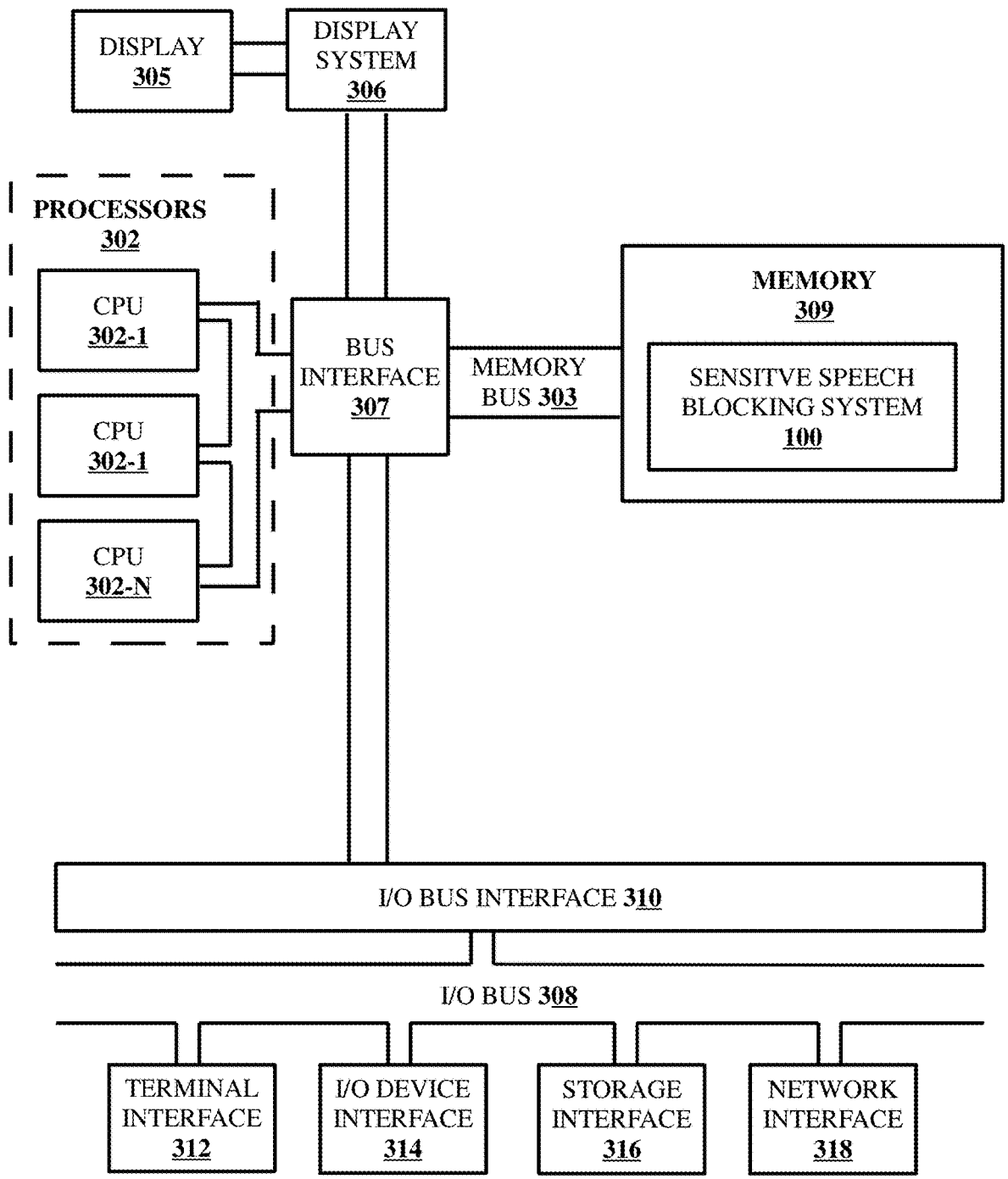
FIG. 3 is a block diagram illustrating a computer system, according to some embodiments of the disclosure.

FIG. 3 is a high-level block diagram illustrating an example computer system 300 that can be used in implementing one or more of the methods, tools, and components, and any related functions, described herein (e.g., using one or more processor circuits or computer processors of the computer), in accordance with embodiments of the present disclosure. In some embodiments, the major components of the computer system 300 may comprise one or more processors 302, a memory subsystem 309, a terminal interface 312, a storage interface 316, an I/O (input/output) device interface 314, and a network interface 318, all of which may be communicatively coupled, directly or indirectly, for inter-component communication via a memory bus 303, an I/O bus 308, bus interface unit 307, and an I/O bus interface unit 310.

The computer system 300 may contain one or more general-purpose programmable central processing units (CPUs) 302-1, 302-2, and 302-N, herein generically referred to as the CPU 302. In some embodiments, the computer system 300 may contain multiple processors typical of a relatively large system; however, in other embodiments the computer system 300 may alternatively be a single CPU system. Each CPU 302 may execute instructions stored in the memory subsystem 309 and may include one or more levels of on-board cache.

The memory 309 may include a random-access semiconductor memory, storage device, or storage medium (either volatile or non-volatile) for storing or encoding data and programs. In some embodiments, the memory 309 represents the entire virtual memory of the computer system 300, and may also include the virtual memory of other computer systems coupled to the computer system 300 or connected via a network. The memory 309 is conceptually a single monolithic entity, but in other embodiments the memory 309 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. The memory 309 may also store a sensitive speech blocking system 100. The sensitive speech blocking system 100 may include one or more channels (e.g., 102-1, 102-2, 102-N of FIG. 1) for recording audible input 101, one or more speech-to-text engines (e.g., 120-1, 120-2, 120-3, 120-4, 120-N in FIG. 1), sensitive word detection engine (e.g., 130, in FIG. 1), a blocking engine (e.g., 140 in FIG. 1), a reporting engine (e.g., 180 in FIG. 1), an output comparison component, and/or settings (e.g., 160 in FIG. 1).

While the sensitive speech blocking system 100 is illustrated as being included within the memory 309 in the computer system 300, in other embodiments, the sensitive speech blocking system 100 can be embodied in or among one or more different computer systems and can be accessed remotely, e.g., via a network. The computer system 300 may use virtual addressing mechanisms that allow the programs of the computer system 300 to behave as if they only have access to a large, single storage entity instead of access to multiple, smaller storage entities. Thus, while the sensitive speech blocking system is illustrated as being included within the memory 309, it is not necessarily completely contained in the same storage device at the same time. Further, although the components of the sensitive speech blocking system 100 can be separate entities, in other embodiments some of these components, portions of some of these components, or all of these components may be packaged together.

In some embodiments, the sensitive speech blocking system 100 may include instructions that execute on the processor 302 or instructions that are interpreted by instructions that execute on the processor 302 to carry out the functions as further described in this disclosure. In another embodiment, the sensitive speech blocking system 100 is implemented in hardware via semiconductor devices, chips, logical gates, circuits, circuit cards, and/or other physical hardware devices in lieu of, or in addition to, a processor based system. In another embodiment, the sensitive speech blocking system 100 may include data in addition to instructions.

Although the memory bus 303 is shown in FIG. 3 as a single bus structure providing a direct communication path among the CPUs 302, the memory subsystem 309, the display system 306, the bus interface 307, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

The computer system 300 may include a bus interface unit 307 to handle communications among the processor 302, the memory 309, a display system 306, and the I/O bus interface unit 310. The I/O bus interface unit 310 may be coupled with the I/O bus 308 for transferring data to and from the various I/O units. The I/O bus interface unit 310 communicates with multiple I/O interface units 312, 314, 316, and 318, which are also known as I/O processors (IOPs) or I/O adapters (IOAs), through the I/O bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 may be a multi-user mainframe computer system, a single-user system, or a server computer or similar device that has little or no direct user interface, but receives requests from other computer systems (clients). Further, in some embodiments, the computer system 300 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, components other than or in addition to those shown in FIG. 3 may be present, and the number, type, and configuration of such components may vary.

In some embodiments, the speech-to-text engine selection processes described herein can be implemented in a cloud computing environment, which is described below with respect to FIGS. 4 and 5. It is to be understood that although this disclosure includes a detailed description of cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
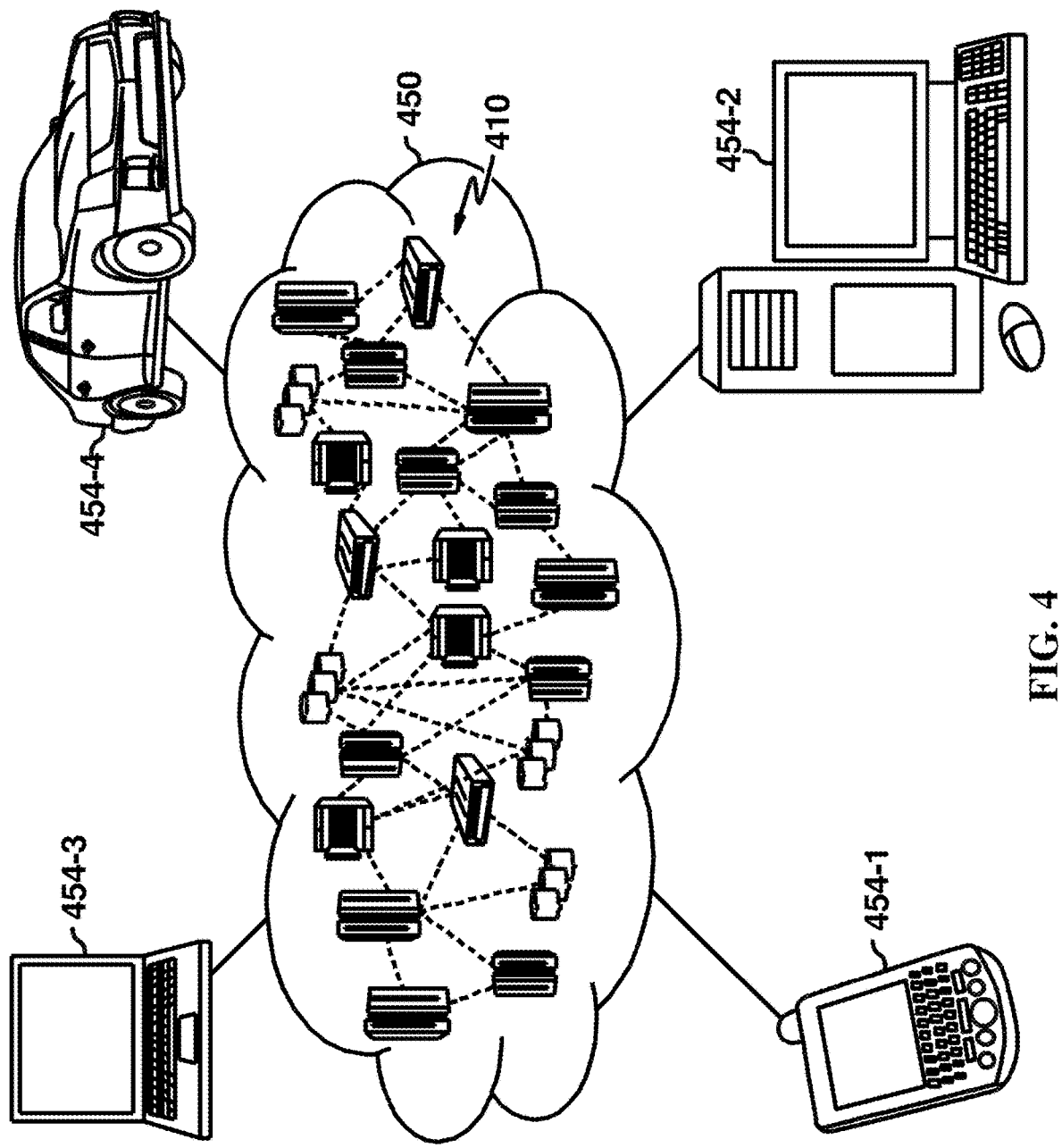
FIG. 4 is a diagrammatic illustration of a cloud computing environment, according to some embodiments of the disclosure

Referring now to FIG. 4, a diagrammatic illustration of a cloud computing environment 450 is depicted. As shown, cloud computing environment 450 includes one or more cloud computing nodes 410 with which local computing devices used by cloud consumers, such as, for example, personal digital assistant (PDA) or cellular telephone 454-1, desktop computer 454-2, laptop computer 454-3, and/or automobile computer system 454-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454-1-454-4 shown in FIG. 4 are intended to be illustrative only and that computing nodes 410 and cloud computing environment 450 can communicate with any type of computerized device over any type of network and/or network addressable connection (e.g., using a web browser).

Figure 5:
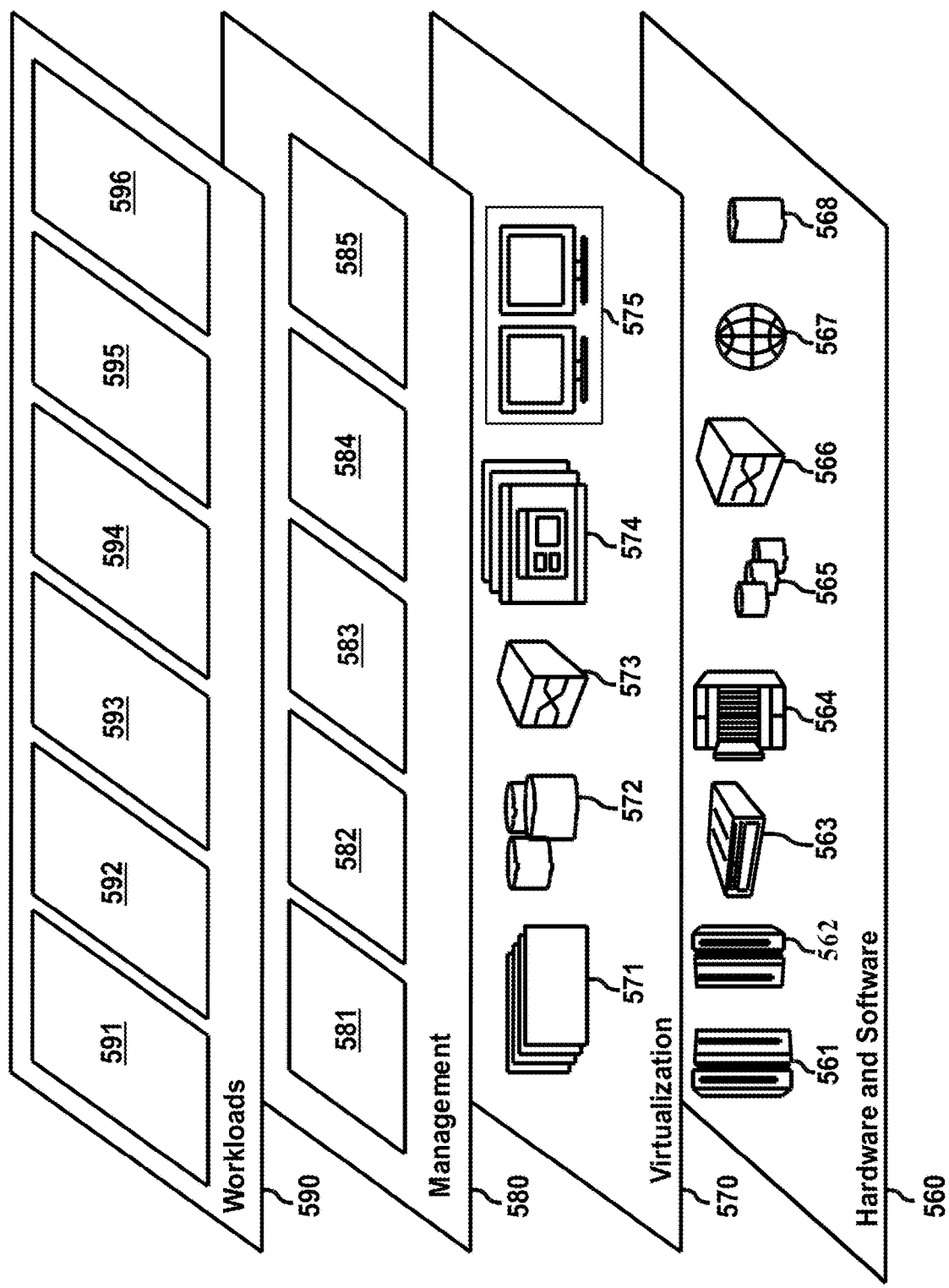
FIG. 5 is a diagrammatic illustration of abstraction model layers, according to some embodiments of the disclosure.

Referring now to FIG. 5, a diagrammatic illustration of a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and speech-to-text engine selection 596.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one processor;
   at least one memory component;
   a live audio stream having one or more spoken words;
   a sensitive word list, wherein the sensitive word list is based on the certification level of a listener;
   at least one speech-to-text engine configured to decode the live audio stream into text;
   a sensitive word detecting engine configured to analyze the text for text strings indicating sensitive information upon matching words in the text strings to the sensitive word list; and
   a blocking engine configured to block the live audio stream when words matching the sensitive word list are detected from the live audio stream,
   wherein the live audio stream is delayed for processing before sending the information to the listener.

2. The system of claim 1,
   wherein the sensitive information is selected from a group consisting of financial information, health information, credit information, passcode information, identity information, and location information; and
   wherein the sensitive information is included in the sensitive word list; and
   wherein the detecting is based upon an incomplete portion of the sensitive information that has been spoken before the detecting is complete.

3. The system of claim 1, wherein the analyzing comprises comparing the text with a known list of sensitive trigger words.

4. The system of claim 1, wherein the text strings comprise one or more words that commonly come before sensitive information.

5. The system of claim 1, wherein the text strings comprise sensitive information.

6. The system of claim 1 further comprising selecting a speech-to-text engine that meets or exceeds an accuracy threshold.

7. A method for blocking sensitive information in an live audio stream comprising:
   receiving the live audio stream, the live audio stream having spoken words, from a live audio feed;
   converting the live audio stream into text with at least one speech-to-text engine;
   analyzing, by a sensitive word detection engine, the text for text strings indicating sensitive information upon matching words in the text strings to a sensitive word list wherein the sensitive word list is based on the certification level of a listener; and
   blocking, by a blocking engine, at least a portion of the live audio stream wherein the portion of the live audio stream that is blocked is at least a portion of the detected sensitive words,
   wherein the live audio stream is delayed for processing before sending the information to the listener.

8. The method of claim 7, wherein the live audio stream is a telephone call.

9. The method of claim 7, wherein the sensitive information is selected from a group consisting of financial information, health information, credit information, passcode information, identity information, and location information.

10. The method of claim 7, wherein the analyzing comprises comparing the text with a known list of sensitive trigger words.

11. The method of claim 7, wherein the text strings comprise one or more words that commonly come before sensitive information.

12. The method of claim 7, wherein the text strings comprise sensitive information.

13. The method of claim 7 further comprising selecting a speech-to-text engine that meets or exceeds an accuracy threshold.

14. A computer program product comprising a computer readable storage medium having program instructions embodied therewith, the program instructions executable by a processor to cause the processor to perform a method comprising:
   receiving the live audio stream, the live audio stream having spoken words, from a live audio feed;
   converting the live audio stream into text with at least one speech-to-text engine;

analyzing, by a sensitive word detection engine, the text for text strings indicating sensitive information upon matching words in the text strings to a sensitive word list wherein the sensitive word list is based on the certification level of a listener; and blocking, by a blocking engine, at least a portion of the live audio stream wherein the portion of the live audio stream that is blocked is at least a portion of the detected sensitive words, wherein the live audio stream is delayed for processing before sending the information to the listener.

15. The computer program product of claim 14, wherein the live audio stream is a telephone call.

16. The computer program product of claim 14, wherein the analyzing comprises comparing the text with a known list of sensitive trigger words.

17. The computer program product of claim 14, wherein the text strings comprise one or more words that commonly come before sensitive information.

18. The computer program product of claim 14, wherein the text strings comprise sensitive information.

\* \* \* \* \*